Patented June 3, 1941

2,244,410

UNITED STATES PATENT OFFICE 2,244,410

TANNING PREPARATION AND METHOD OF MAKING THE SAME

Fredrick J. Wallace, Erie, Pa., assignor to Robeson Process Company, New York, N. Y., a corporation of New Jersey No Drawing. Application July 31, 1940, Serial No. 348,922

10 Claims. (Cl. 260—124)

This invention or discovery relates to tanning preparations and methods of making the same; and it comprises a method of freeing tanning extracts made by fermentation of sulfite waste liquor, from sulfur compounds which form strongly colored compounds with copper, wherein such tanning extracts are subjected to a limited chlorination; and it further comprises an improved tanning extract comprising fermented, carbohydrate-free sulfite waste liquor, substantially free of sulfur compounds yielding colored compounds with copper; all as more fully hereinafter set forth and as claimed.

In one process of making paper pulp, wood is digested with an acid bisulfite liquor at elevated temperatures and pressures. The non-cellulose part of the wood goes into solution, leaving the cellulose fibers (about one-half the weight of the wood) undissolved. The extraction liquor is known as sulfite waste liquor. As it comes from the digester, it is a complex solution containing mostly lignin, in the form of lignosulfonic acids or lignosulfonates, which are valuable tanning agents, together with smaller amounts of various carbohydrates which are not desirable in tanning preparations. Among the carbohydrates are hexose ($C_6$) sugars, in amount sufficient to make it occasionally worth while to ferment the liquor, with yeast, as a source of alcohol. In addition there are various other carbohydrates, largely pentoses ($C_5$ sugars) and pentosans. These are not fermented by yeast.

In making tanning preparations ("tanning extracts") from sulfite waste liquor the weak liquor is neutralized with lime and concentrated by evaporation. The thick liquor, which may have a gravity of about 33 degrees Baumé, is treated with dilute sulfuric acid. This throws down the lime as calcium sulfate and sets free the lignosulfonic acid as a 30 degree Baumé liquor. If the neutralized liquor is fermented with yeast to get rid of glucose (hexose sugars) a better tanning preparation is made after evaporation and acidulation than if these sugars are allowed to remain. The improvement however is not very great.

I have previously found that by fermenting the neutralized liquor with various bacteria to get rid not only of hexoses but also of pentoses, pentosans, etc., a much better tanning preparation can be made. In the process of my Patent 1,952,642, pentoses and pentosans are fermented with certain bacteria giving volatile products; acetone, butyl alcohol, etc. In the process of my Patent 1,952,643 bacteria are used which convert carbohydrates into lactic acid. This is a desirable constituent in the tanning bath and is left in the preparation. In the process of my Patent 2,142,739 fermentation is under aerobic conditions, employing Aspergillus niger and other mold organisms which convert carbohydrates into citric acid. This is removed as an insoluble lime salt. All three ways of fermenting give tanning extracts of good quality; they make excellent leathers when used on hide. They are commercially used alone and in commixture with other tanning extracts; particularly chestnut extract.

In sulfite waste liquor, sulfur exists in many forms, mostly stable, and this is also true of yeast fermented liquors. But the fermentative action of the bacteria which act on the pentoses and pentosans is much more energetic and some sulfur is converted into forms which are reactive with heavy metals; which are equivalent to sulfide sulfur.

Coloring action of tanning preparations on hides and leather is not necessarily undesirable, if the coloring be clear and uniform, and is sometimes quite desirable. But in some cases there is an objectionable development of superficial discolorations and stains in tanning; irregular dark streaks and the like. This discoloration is most apparent when certain blending agents, especially chestnut extract, are used with the fermented sulfite waste liquor preparations.

I have found that these difficulties are apparently due to the development of new reactive sulfur compounds in the fermenting operation; sulfur compounds which react with heavy metals and particularly copper, to give objectionable discolorations. Chestnut extract and some other vegetable extracts often contain traces of copper. In detail, the micro-organisms employed in the complete fermentation of the carbohydrate content of the liquor as described are capable of converting some of the organically bound sulfur to free colloidal sulfur or to sulfides, or to intermediate sulfur compounds, including sulfates, mercaptans, sulfones and sulfur ether. These secondary compounds, or some of them, react with soluble copper salts to form dark-colored or black colloidal copper-sulfur complexes. Production of discoloration is not serious when the bacterially fermented sulfite waste liquor preparation is used alone, but does sometimes appear on blending the preparation with chestnut extract. The copper-sulfur compounds are deposited on the surface of the hide in the early stages of tanning.

The present invention is further based on the discovery that by treatment of these fermented liquors with a limited amount of chlorine, the objectionable effects of the sulfur impurities are obviated. The chlorine can be supplied at any stage in the treatment after the fermentation. It is commonly most convenient to treat the commercial tanning preparation; a thick sirup of about 30° Bé. (45 per cent solid content). The chlorine is simply introduced as a gas, as by supplying liquid chlorine to diffusers at the bottom of a suitable vessel; the chlorine changing to a gas by reason of the pressure drop at the diffusers. The chlorine can also be introduced in the form of a salt such as calcium or sodium hypochlorite, calcium chlorite, sodium chlorite, or other salts capable of liberating chlorine. The proportion of chlorine added is determined in a manner described below and usually is about one per cent, or within the range 0.1 to 5.0 per cent, by weight, on these concentrated (30° Bé.) extracts.

The amount of chlorine to add to a given batch of fermented liquor is readily determinable with the aid of a simple test. The proportion of copper-precipitating sulfur compounds present in the fermented liquor is determined in the aggregate by treatment of the preparation with cupric acetate, with determination of the insoluble copper compound thereby formed. For example, 500 grams of the commercial preparation (a sirup of of 30° Bé. or 45 per cent "solid" content) are treated with 5.0 grams of cupric acetate dissolved in water. At the end of 48 hours the extract is diluted with an equal amount of hot water and is filtered through paper under vacuum. The insoluble copper remaining on the paper is determined by standard analytical methods and is expressed as milligrams of copper precipitated per 500 grams of such a 30° Bé. extract. The number of milligrams is conveniently termed the copper number of the extract.

The copper number of ordinary unfermented sulfite waste liquor preparations made by neutralizing the liquor with lime, filtering, evaporation and sulfuric acid neutralization of the lime, is zero. That is, no sulfur compounds are present capable of precipitating soluble copper from solution. The case is similar with yeast fermented sulfite waste liquors. On the other hand, the copper numbers of the fermented concentrates described in the acknowledged patents is generally 500 or more; that is, 500 grams of the preparation contains enough sulfur compounds of the copper-reactive type to precipitate 500 milligrams or more of copper. By proceeding according to the present invention the copper number can be reduced to a strictly negligible value; 50 or less. In general, reduction of the copper number to a figure below about 250 is sufficient, except when very stringent requirements of color have to be met.

In practice, for a given batch of bacterially fermented sulfite waste liquor, the amount of chlorine required to bring the copper number of the batch below the desired value is determined by test. Then should a new copper number limit be selected the amount of chlorine is varied accordingly. Or if the copper number of a future batch is different, the proportion of chlorine is increased or decreased as the case may be.

The temperature at which the chlorination is carried out is not very critical. The range 110 to 140° F. is advantageous and in almost all cases the temperature lies in the range 60 to 200°, but good results are obtained in a range from 40° to 212° F.

The chlorine-treated extract produced by the present process can be used alone or mixed with chestnut extract and other blending agents in any proportion, to give a preparation which tans hides to yield clear uniformly colored leather, entirely acceptable to the trade.

Following are three illustrative examples of specific embodiments of processes within the purview of the invention.

I. In one embodiment of the invention, 100,000 gallons of raw acid sulfite waste liquor were neutralized with lime to pH 7.00, cooled, and fermented with lacto-bacillus pentoaceticus as described in the acknowledged U. S. Patent 1,952,643. At the end of 48 hours fermenation was complete. The liquor was concentrated to 31° Bé., treated with sulfuric acid to precipitate the combined lime, and filtered to remove the calcium sulfate. The analysis of the filtered liquor is given in Table I, below. A batch of 150,000 pounds of the filtered extract was then cooled to 130° F., and 1500 pounds of liquid chlorine were slowly passed through the extract by means of diffusers, in a known type of chlorinator, the liquid chlorine being converted to gas on release of pressure at the diffusers. The extract was then filtered. The analysis of the filtered preparation appears in the table. Before chlorination the extract had a copper number of 520.0, determined as described above, and after chlorination and filtration the extract had a copper number of only 3.0. Except for the lessening in copper number and a moderate but significant decrease in the proportion of non-tans, the properties of the extract are little changed by the chlorination step.

TABLE I

Analyses of extracts according to Example I before and after chlorination

|  | Before chlorination | After chlorination |
| --- | --- | --- |
| Density, degrees Baumé | 27.5 | 27.6 |
| Copper number* | 520.0 | 3.0 |
| Total solids | 47.51 | 47.62 |
| Soluble solids | 47.27 | 47.62 |
| Insoluble solids | .24 | .00 |
| Tannin | 30.26 | 30.74 |
| Non tannin | 19.01 | 16.88 |
| Purity | 63.6 | 64.4 |
| Lactic acid | 5.25 | 5.19 |
| pH | 3.20 | 3.16 |

* Milligrams copper precipitated per 500 grams extract.

The figures for solid content, tans and nontans and lactic acid are in per cent by weight.

The chlorine treated preparation, alone or blended with chestnut extract, yields excellently tanned hides of clear and uniform color.

II. In another specific embodiment, 75,000 gallons of sulfite waste liquor were fermented by the processes described in U. S. Patent No. 1,952,642, the fermentation being carried out by *Bacillus macerans*. At the end of 36 hours the liquor was evaporated to 31° Bé. and treated with sulfuric acid to remove lime. Analysis of the treated extract appears in Table II. A batch of 112,000 pounds of the filtered extract was cooled to 130° F. and treated with 56 pounds of liquid chlorine converted to gas by means of diffusers. The chlorinated extract was then filtered. The analysis of the filtrate appears in the table. The extract before chlorination showed a copper number of 491.0, and after chlorination showed a copper number of 27.0.

TABLE II

*Analyses of extracts according to Example II*

|  | Before chlorination | After chlorination |
|---|---|---|
| Density, degrees Baumé | 28.1 | 28.3 |
| Copper number | 491.0 | 27.0 |
| Total solids | 48.04 | 48.21 |
| Soluble solids | 47.73 | 48.21 |
| Insoluble solids | .31 | .00 |
| Tannin | 31.04 | 31.42 |
| Non tannin | 16.69 | 16.79 |
| Purity | 64.6 | 65.2 |
| pH | 3.42 | 3.35 |

III. In another specific example, 10,000 pounds of sulfite waste liquor were fermented with *Aspergillus niger* as described in U. S. Patent No. 2,142,739. The liquor after removal of the citric acid was concentrated and treated with sulfuric acid to remove organically combined lime. Fifteen hundred pounds of the concentrated liquor were treated with 23 pounds of calcium hypochlorite and then filtered. The extract before treatment with calcium hypochlorite had a copper number of 512 and after treatment and filtration had a copper number of 51. Properties before and after chlorination are shown in Table III.

TABLE III

*Analyses of extracts according to Example III*

|  | Before chlorination | After chlorination |
|---|---|---|
| Density, degrees Baumé | 26.2 | 26.4 |
| Copper number | 512.0 | 51.0 |
| Total solids | 46.87 | 46.95 |
| Soluble solids | 46.62 | 46.95 |
| Insoluble solids | .25 | .00 |
| Tannin | 29.80 | 30.19 |
| Non tannin | 16.82 | 16.77 |
| Purity | 63.6 | 64.3 |
| pH | 3.41 | 3.36 |

The chlorinated preparations of Examples II and III, like that of Example I, are excellent tanning agents and give clear uniform coloration of leather when used alone or in admixture with chestnut extract or like blending agents.

The invention has been described primarily with reference to chlorine as the agent for removal of the copper-precipitating sulfur compounds. Other halogens, such as iodine and bromine, and their corresponding compounds, give equally good results, but chlorine is generally most convenient in practice, because of its availability and low cost.

What I claim is:

1. In the improvement of tanning extracts from sulfite waste liquors fermented with bacteria capable of fermenting pentoses, said fermented liquors containing copper-precipitating compounds, the method which comprises subjecting the so fermented liquor to the action of chlorine, in such amount and under such conditions as to substantially diminish the content of copper-precipitating compounds.

2. In the improvement of sulfite waste liquor tanning extracts fermented with bacteria capable of fermenting hexoses and pentoses, the process which comprises subjecting the extract to the action of a small amount of a halogen in reactive form.

3. A method of making improved tanning preparations from sulfite waste liquors fermented with bacteria capable of fermenting pentoses, which comprises treating such a fermented liquor, of density about 30 degrees Baumé, with chlorine, until about 0.1 to 5 per cent chlorine based on the weight of the liquor is fixed in combination.

4. The method of claim 1 wherein the chlorine is supplied as elemental chlorine.

5. The method of claim 1 wherein the chlorine is supplied in the form of a chlorine compound capable of releasing free chlorine to the liquor.

6. The method of claim 1 wherein the treatment with chlorine is carried out at a temperature between 40 and 212 degrees Fahrenheit.

7. The method of claim 1 wherein the treatment with chlorine is carried out at a temperature between 110 and 140 degrees Fahrenheit.

8. The method of claim 1 wherein enough chlorine is supplied to diminish the copper number of the extract below 250.

9. A tanning preparation capable of tanning hides with clear, uniform coloration, comprising bacterially fermented carbohydrate-free sulfite waste liquor substantially free of copper-precipitating sulfur compounds, said sulfite waste liquor being fermented with bacteria capable of fermenting pentoses.

10. A tanning extract capable of tanning hides without undesired discoloration, comprising bacterially fermented carbohydrate-free sulfite waste liquor, containing a less proportion of copper-precipitating compounds than corresponds to a copper number of 250, said sulfite waste liquor being fermented with bacteria capable of fermenting pentoses.

FREDRICK J. WALLACE.